UNITED STATES PATENT OFFICE 2,651,591

ANTICOAGULANT RODENTICIDE

Geza S. Delmar, Baie d'Urfe, Quebec, and Ernest Neil Macallum, Lachine, Quebec, Canada, assignors to Delmar Chemicals Limited, Lachine, Quebec, Canada, a corporation of Canada No Drawing. Application May 7, 1952,
Serial No. 286,624

2 Claims. (Cl. 167—46)

The present invention relates to a new 3-substituted 4-hydroxycoumarin suitable as a rodenticide due to its high anticoagulant index and a process for preparing same.

Prior art

It is known that many 3-substituted 4-hydroxycoumarins possess high anticoagulant indices and are effective as rodenticides. A large number of 3-substituted 4-hydroxycoumarins have been described to their anticoagulant indices in the Journal of Biological Chemistry, vol. 113 (1944) pp. 5–24. From this work it became obvious, that for high anticoagulant potency it is necessary to have either the bis-4-hydroxycoumarin molecule or a 4-hydroxycoumarin with the 3-substituent containing a keto group in the 1.5 position with respect to the 4-hydroxyl group.

All experimental work so far was directed towards the investigation of the effect of variations and/or substitutions in the above stipulated basic requirements. Among the possible substitutions however, all experimental work was restricted to hydroxyl or halogen groups introduced into various parts of the molecule.

Applicants' development

In accordance with the present invention it has now been found that when the p-acetaminophenyl radical is substituted on the alpha position of 3-(beta-acetylethyl)-4-hydroxycoumarin, a new product is obtained which surprisingly possesses high anticoagulant properties thus rendering the product particularly effective as a rodenticide.

The compound of the present invention is the 3-(alpha - (p - acetamino)-phenyl, beta-acetylethyl)-4-hydroxycoumarin and corresponds to the formula:

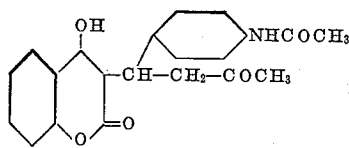

The new compound is obtained by condensing 4-hydroxycoumarin with p-acetamino-benzalactone, the reactants being dissolved in a solvent and the condensation being carried out in the presence of dioxane. The preferred solvent is piperidine and there may also be used pyridine.

Example

The preparation of the product of the present invention will be illustrated by referring to the following example.

405 grams of 4-hydroxycoumarin, 510 grams of p-acetamino-benzalactone, 50 cc. of piperidine and 1500 cc. of dioxane are refluxed for several hours. A solution results from which the desired product precipitates when the solution is poured under stirring into a large amount of water.

The resulting product is a yellow powder which is substantially insoluble in water, but soluble in alcohol, dioxane and acetic acid. The product obtained is 3 - (alpha - (p - acetamino)-phenyl-beta - acetylethyl) - 4 - hydroxycoumarin which melts at approximately 160° C.

The product is used as a rodenticide in admixture with an edible carrier. When assayed on rats this product proved to have a high hemorrhagic potency. When fed to rats at a concentration of 0.025% in admixture with a balanced rat diet the mortality of the rats was found to be at the same level as in rats fed with 3-(alpha-phenyl-beta-acetylethyl)-4-hydroxycoumarin.

We claim:
1. As a new product, 3-(alpha-(p-acetamino)-phenyl-beta-acetylethyl)-4-hydroxycoumarin.
2. As a rodenticide composition, a food product as an edible carrier and as a toxic ingredient at least 0.025% of 3 - (alpha - (p - acetamino)-phenyl-beta-acetylethyl)-4-hydroxycoumarin.

GEZA S. DELMAR.
E. NEIL MACALLUM.

References Cited in the file of this patent

UNITED STATES PATENTS

| Number | Name | Date |
|---|---|---|
| 2,427,578 | Stahmann et al. | Sept. 16, 1947 |